United States Patent
Liu et al.

(10) Patent No.: US 11,523,263 B2
(45) Date of Patent: Dec. 6, 2022

(54) METHOD AND DEVICE FOR SENDING MEDICAL INSTRUMENT DATA, AND METHOD AND DEVICE FOR RECEIVING MEDICAL INSTRUMENT DATA

(71) Applicant: BMC MEDICAL CO., LTD., Beijing (CN)

(72) Inventors: Weifeng Liu, Beijing (CN); Zhi Zhuang, Beijing (CN)

(73) Assignee: BMC MEDICAL CO., LTD., Beijing (CN)

( * ) Notice: Subject to any disclaimer, the term of this patent is extended or adjusted under 35 U.S.C. 154(b) by 225 days.

(21) Appl. No.: 16/965,610

(22) PCT Filed: Dec. 13, 2018

(86) PCT No.: PCT/CN2018/120829
§ 371 (c)(1),
(2) Date: Jul. 29, 2020

(87) PCT Pub. No.: WO2019/144721
PCT Pub. Date: Aug. 1, 2019

(65) Prior Publication Data
US 2021/0051459 A1  Feb. 18, 2021

(30) Foreign Application Priority Data
Jan. 29, 2018  (CN) .......................... 201810084558.0

(51) Int. Cl.
*H04W 4/80* (2018.01)
*H04W 4/70* (2018.01)
*H04L 67/12* (2022.01)

(52) U.S. Cl.
CPC ............... *H04W 4/80* (2018.02); *H04L 67/12* (2013.01); *H04W 4/70* (2018.02); *H04L 2212/00* (2013.01)

(58) Field of Classification Search
CPC ............ H04W 4/80; H04W 4/70; H04L 67/12
See application file for complete search history.

(56) References Cited

U.S. PATENT DOCUMENTS

2007/0255116 A1* 11/2007 Mehta ................ A61B 5/14532
                                                         600/300
2012/0257561 A1* 10/2012 Redding ............. H04L 12/1827
                                                         370/312
(Continued)

FOREIGN PATENT DOCUMENTS

CN          102940483 A        2/2013
CN          103856249 A        6/2014
(Continued)

*Primary Examiner* — David Bilodeau
(74) *Attorney, Agent, or Firm* — Bayramoglu Law Offices LLC

(57) ABSTRACT

A method for sending the medical instrument data is based on a Bluetooth protocol and includes: starting a Bluetooth module; acquiring therapy data; according to a data packet encapsulation way of a standard Bluetooth protocol, filling a data length of the therapy data into a data length Len segment of a Bluetooth data packet, setting a designated data type and filling the designated data type into a data type AD Type segment, coding the therapy data according to a preset coding rule, and then filling the coded therapy data into a data AD data segment, so that a broadcast data packet is formed; and broadcasting the broadcast data packet according to a preset period in a Bluetooth broadcast mode.

16 Claims, 6 Drawing Sheets

(56) References Cited

U.S. PATENT DOCUMENTS

| | | | | |
|---|---|---|---|---|
| 2014/0073252 A1* | 3/2014 | Lee | ............... | H04M 1/72412 |
| | | | | 455/41.2 |
| 2014/0154986 A1* | 6/2014 | Lee | ............... | H04B 7/26 |
| | | | | 455/41.2 |
| 2015/0156602 A1* | 6/2015 | Nakao | ............... | H04W 4/80 |
| | | | | 455/41.2 |
| 2015/0358780 A1* | 12/2015 | Saari | ............... | H04W 52/245 |
| | | | | 370/252 |
| 2016/0157078 A1* | 6/2016 | Palin | ............... | H04W 4/80 |
| | | | | 455/41.2 |
| 2017/0041868 A1* | 2/2017 | Palin | ............... | H04W 52/0216 |
| 2017/0164163 A1* | 6/2017 | Lee | ............... | H04W 76/10 |
| 2017/0215113 A1* | 7/2017 | Lee | ............... | H04W 8/005 |

FOREIGN PATENT DOCUMENTS

| | | | |
|---|---|---|---|
| CN | 103856629 | A | 6/2014 |
| CN | 103856630 | A | 6/2014 |
| CN | 103856916 | A | 6/2014 |
| CN | 104218979 | A | 12/2014 |
| CN | 104333401 | A | 2/2015 |
| CN | 104901724 | A | 9/2015 |
| CN | 205123788 | U | 3/2016 |
| CN | 106790437 | A | 5/2017 |
| CN | 106935014 | A | 7/2017 |
| CN | 108391237 | A | 8/2018 |
| EP | 2753104 | A1 | 7/2014 |

\* cited by examiner

METHOD AND DEVICE FOR SENDING MEDICAL INSTRUMENT DATA, AND METHOD AND DEVICE FOR RECEIVING MEDICAL INSTRUMENT DATA

CROSS REFERENCE TO THE RELATED APPLICATIONS

This application is the national phase entry of International Application No. PCT/CN2018/120829, filed on Dec. 13, 2018, which is based upon and claims priority to Chinese Patent Application No. 201810084558.0, filed on Jan. 29, 2018, the entire contents of which are incorporated herein by reference.

TECHNICAL FIELD

The disclosure relates to the field of medical instrument technologies, and more particularly, to a method and device for sending medical instrument data, and a method and device for receiving medical instrument data.

BACKGROUND

With the continuous development of the medical industry, a medical instrument, such as a household positive-pressure ventilation therapy machine (hereinafter referred to as a "respirator"), is continuously pervading a life of a patient. The medical instrument may record therapy data of a user during use and generate a historical therapy data report, and a doctor may acquire the therapy data through a receiving-end device and adjust a therapeutic schedule for the patient according to the acquired therapy data. Therefore, it is of great significance to acquire the therapy data of the patient on the medical instrument timely, rapidly and conveniently.

At present, the therapy data of the medical instrument is usually transmitted to the receiving-end device through Bluetooth. FIG. 1 illustrates a data transmission pairing process based on a Bluetooth protocol taking the respirator as an example. Firstly, the respirator broadcasts device information of the respirator itself through a self-provided Bluetooth module or a Bluetooth transmission unit connected with the respirator during a device discovery process. After receiving the device information broadcasted by the respirator, a terminal device sends a scanning request to the respirator. After receiving the scanning request, the respirator returns a scanning response to the terminal device. After receiving the scanning response, the terminal device sends a connecting request to the respirator (the above processes are all data interactions when the respirator and the terminal device are not paired, and the above processes are referred to as a Bluetooth broadcast mode in the disclosure).

At this time, encryption and an authentication key are generated between the respirator and the terminal device. The user inputs a password in the respirator to pair the respirator with the terminal device, and the respirator transmits the therapy data to the terminal device connected with the respirator after successful pairing. Further, the terminal device and the respirator may also be bound, so as to complete pairing rapidly during next connection.

As shown in FIG. 2, each Bluetooth data packet includes 31 bytes and is divided into a valid data part and an invalid data part. The valid data part includes a plurality of broadcast data units and is called an AD Structure. As shown in FIG. 2, the AD Structure consists of a data length Len and broadcast data, wherein the broadcast data includes a data type AD Type and a data AD data. The Len refers to a length of the AD Structure; and the AD Type refers to what the broadcast data represents, such as a device name, a Universally Unique Identifier (UUID), and the like. According to the invalid data part, since the Bluetooth protocol stipulates that a length of the Bluetooth data packet must be 31 bytes, when a length of the valid data part is less than 31 bytes, the remaining bytes are complemented with 0, and this part of data is called invalid data.

The respirator firstly needs to be successfully paired with the terminal device through the Bluetooth before transmitting the therapy data during transmission of the above conventional therapy data of the respirator. Moreover, the respirator can only be connected with one terminal device at a time. In the case that a plurality of terminal devices need to acquire the therapy data of the respirator, or a single terminal device needs to acquire data of a plurality of respirators, different respirators and different terminal devices all need to be paired repeatedly for many times to transmit the therapy data. Thus it can be seen that, the conventional transmission scheme of the therapy data is complicated in operation and low in transmission efficiency. Moreover, most patients treated with the respirator are the elderly, a Bluetooth pairing mode is obviously not conducive to operation of the elderly, and is even more unfavorable to convenient transmission of data. However, it is precisely the use data of the elderly that is very critical in an actual application. Obviously, the complicated pairing mode seriously hinders remote extraction of the therapy data of the patient.

Therefore, it is needed to improve the problem in the above prior art.

SUMMARY

Aiming at the problem in the prior art, the disclosure provides a new technical solution used in a method for sending medical instrument data and a method for receiving medical instrument data.

According to a first aspect of embodiments of the disclosure, a method for sending medical instrument data based on a Bluetooth protocol is provided, which includes: starting a Bluetooth module; acquiring therapy data of a medical instrument; according to a data packet encapsulation method of a standard Bluetooth protocol, filling a data length of the therapy data into a data length Len segment of a Bluetooth data packet, presetting a designated data type and filling the designated data type into a data type AD Type segment, coding the therapy data according to a preset coding rule, and then filling the coded therapy data into a data AD data segment, so that a broadcast data packet is formed; and broadcasting the broadcast data packet according to a preset period in a Bluetooth broadcast mode. The therapy data of the medical instrument is sent to a terminal device in the Bluetooth broadcast mode through the embodiments of the disclosure, without needing to pair the terminal device with a respirator one to one, and compared with a conventional respirator data transmission scheme, the method is simple in operation and high in transmission efficiency, and may be suitable for various application scenarios. Moreover, for an elderly user, since a complicated Bluetooth pairing process is not needed, the method is obviously more conducive to operation of the elderly user, and convenient for remote extraction of therapy data of the user.

Optionally, the method further includes: when broadcasting the broadcast data packet, receiving, by the medical instrument, a scanning request from an external terminal, the scanning request containing a data type instruction needed by the external terminal, wherein the data type instruction is designated therapy data needed to be acquired by the external terminal; according to the data type instruction in the scanning request, acquiring new therapy data corresponding to the medical instrument, according to the data packet encapsulation method of the standard Bluetooth protocol, filling a data length of the new therapy data into the Len segment of the Bluetooth data packet, setting the designated data type and filling the designated data type into the AD Type segment, coding the new therapy data according to the preset coding rule, and then filling the coded new therapy data into the AD data segment, so that a new broadcast data packet is formed; and broadcasting the new broadcast data packet according to the preset period in the Bluetooth broadcast mode. The medical instrument acquires the designated medical data by receiving an instruction of the scanning request from the external terminal, and the data may be acquired in a targeted manner according to requirements of the external terminal to meet data requirements of different external terminals.

Optionally, the preset coding rule includes: according to data information of a plurality of statistical data contents including a data sub-packet indicating bit, a total frame number of data, a current frame number and the therapy data, sequentially generating a decimal character string; converting the decimal character string into a hexadecimal character string; and sequentially converting each character in the hexadecimal character string into a corresponding ASCII code to acquire a corresponding ASCII code character string, wherein the data information of the statistical data contents is acquired by sequential arrangement according to a preset sequence. A confidentiality of the therapy data during transmission may be improved through the preset coding rule in the embodiments of the disclosure. In addition, sub-packet transmission may be performed for a condition that one broadcast data packet cannot completely cover a large amount of data information, and the sub-packet indicating bit, the total frame number of data and the current frame number are set in the broadcast data packet, so that the terminal device determines whether the complete broadcast data packet is received accordingly.

Optionally, the therapy data includes: a serial number of the medical instrument, manufacturer information of the medical instrument, and statistical data and/or real-time data of the medical instrument within a statistical period. The above therapy data is acquired in the embodiments of the disclosure, so that a doctor may adjust a therapeutic schedule of a patient through the above data.

According to a second aspect of the embodiments of the disclosure, a method for receiving medical instrument data based on a Bluetooth protocol is provided, which includes: receiving a broadcast data packet in a Bluetooth broadcast mode; according to a data packet parsing method of a standard Bluetooth protocol, parsing the broadcast data packet to acquire a content filled into a data type AD Type segment in the broadcast data packet; and if the content filled into the AD Type segment is a designated data type, acquiring a content filled into a data AD data segment in the broadcast data packet, decoding the content according to a preset decoding rule, and then acquiring therapy data of the medical instrument; and displaying the therapy data. A terminal device receives the broadcast data packet in the Bluetooth broadcast mode through the embodiments of the disclosure, thus acquiring and displaying the therapy data in the broadcast data packet, and compared with the prior art, the terminal device and the medical instrument do not need to be paired one to one, so that the method is simple in operation and high in transmission efficiency, and may be suitable for various application scenarios. Moreover, for an elderly user, since a complicated Bluetooth pairing process is not needed, the method is obviously more conducive to operation of the elderly user, and convenient for remote extraction of therapy data of the user.

Optionally, before the displaying the therapy data, the method further includes: sending a scanning request, the scanning request containing a data type instruction needed by a terminal, wherein the data type instruction is used for indicating designated therapy data needed to be acquired by the terminal; receiving a new broadcast data packet; and according to the data packet parsing method of the standard Bluetooth protocol, parsing the new broadcast data packet to acquire a content filled into an AD Type segment in the new broadcast data packet; and if the content filled into the AD Type segment is the designated data type, acquiring a content filled into an AD data segment in the broadcast data packet, decoding the content according to the preset decoding rule, and then acquiring the designated therapy data. The terminal device may send the scanning request containing the data type instruction needed by the terminal according to data requirements of the terminal device itself to acquire the designated medical data, thus meeting data requirements of different external terminals.

Optionally, the preset decoding rule includes: converting an ASCII code character string into a corresponding hexadecimal character string; converting the hexadecimal character string into a decimal character string; and according to a sequence of each character in the decimal character string, sequentially determining data information of a plurality of statistical data contents including a data sub-packet indicating bit, a total frame number of data, a current frame number and the therapy data, wherein the data information of the statistical data contents is acquired by sequential arrangement according to a preset sequence. A confidentiality of the therapy data during transmission may be improved through the preset coding rule in the embodiments of the disclosure. In addition, sub-packet transmission may be performed for a condition that one broadcast data packet cannot completely cover a large amount of data information, and the sub-packet indicating bit, the total frame number of data and the current frame number are set in the broadcast data packet, so that the terminal device determines whether the complete broadcast data packet is received accordingly.

Optionally, the therapy data includes: a serial number of the medical instrument, manufacturer information of the medical instrument, and statistical data and/or real-time data of the medical instrument within a statistical period. The above therapy data is acquired in the embodiments of the disclosure, so that a doctor may adjust a therapeutic schedule of a patient through the above data. According to a third aspect of the embodiments of the disclosure, a device for sending medical instrument data based on a Bluetooth protocol is provided, which includes: a control module, configured to start a Bluetooth module; a collection module, configured to extract therapy data of a medical instrument; an operation module, configured to, according to a data packet encapsulation method of a standard Bluetooth protocol, fill a data length of the therapy data into a data length Len segment of a Bluetooth data packet, preset a designated data type and fill the designated data type into a data type AD Type segment, code the therapy data according to a preset coding rule, and then fill the coded therapy data into a data AD data segment, so that a broadcast data packet is formed; and the Bluetooth module, configured to broadcast the broadcast data packet according to a preset period in a Bluetooth broadcast mode. The therapy data of the medical instrument is sent to a terminal device in the Bluetooth broadcast mode through the embodiments of the disclosure, without needing to pair the terminal device with a respirator one to one, and compared with a conventional respirator data transmission scheme, the device is simple in operation and high in transmission efficiency, and may be suitable for various application scenarios. Moreover, for an elderly user, since a complicated Bluetooth pairing process is not needed, the device is obviously more conducive to operation of the elderly user, and convenient for remote extraction of therapy data of the user.

Optionally, the Bluetooth module is further configured to, when broadcasting the broadcast data packet, receive a scanning request from an external terminal; the operation module is further configured to parse a data type instruction contained in the scanning request, wherein the data type instruction is designated therapy data needed to be acquired by the external terminal; the collection module is further configured to, according to a parsing result of the operation module, collect new therapy data corresponding to the medical instrument; the operation module is further configured to, according to the data packet encapsulation method of the standard Bluetooth protocol, fill a data length of the new therapy data into the Len segment of the Bluetooth data packet, set the designated data type and fill the designated data type into the AD Type segment, code the new therapy data according to the preset coding rule, and then fill the coded new therapy data into the AD data segment, so that a new broadcast data packet is formed; and the Bluetooth module is further configured to broadcast the new broadcast data packet according to the preset period in the Bluetooth broadcast mode. The medical instrument acquires the designated medical data by receiving an instruction of the scanning request from the external terminal, and the data may be acquired in a targeted manner according to requirements of the external terminal to meet data requirements of different external terminals.

Optionally, the preset coding rule includes: according to data information of a plurality of statistical data contents including a data sub-packet indicating bit, a total frame number of data, a current frame number and the therapy data, sequentially generating a decimal character string; converting the decimal character string into a hexadecimal character string; and sequentially converting each character in the hexadecimal character string into a corresponding ASCII code to acquire a corresponding ASCII code character string, wherein the data information of the statistical data contents is acquired by sequential arrangement according to a preset sequence. A confidentiality of the therapy data during transmission may be improved through the preset coding rule in the embodiments of the disclosure. In addition, sub-packet transmission may be performed for a condition that one broadcast data packet cannot completely cover a large amount of data information, and the sub-packet indicating bit, the total frame number of data and the current frame number are set in the broadcast data packet, so that the terminal device determines whether the complete broadcast data packet is received accordingly.

Optionally, the therapy data includes: a serial number of the medical instrument, manufacturer information of the medical instrument, and statistical data and/or real-time data of the medical instrument within a statistical period. The above therapy data is acquired in the embodiments of the disclosure, so that a doctor may adjust a therapeutic schedule of a patient through the above data.

According to a fourth aspect of the embodiments of disclosure, a device for sending medical instrument data is provided, which includes a processor, a memory and a computer program stored on the memory and executable on the processor, wherein when executed by the processor, the computer program implements the above method for sending the medical instrument data.

According to a fifth aspect of the embodiments of disclosure, a computer-readable storage medium is provided, wherein a computer program is stored on the computer-readable storage medium, and when executed by a processor, the computer program implements the above method for sending the medical instrument data.

According to a sixth aspect of the embodiments of the disclosure, a device for receiving medical instrument data based on a Bluetooth protocol is provided, which includes: a receiving module, configured to receive a broadcast data packet in a Bluetooth broadcast mode; a parsing module, configured to, according to a data packet parsing method of a standard Bluetooth protocol, parse the broadcast data packet to acquire a content filled into a data type AD Type segment in the broadcast data packet; and if the content filled into the AD Type segment is a designated data type, acquire a content filled into a data AD data segment in the broadcast data packet, decode the content according to a preset decoding rule, and then acquire therapy data of the medical instrument; and a display module, configured to display the therapy data. A terminal device receives the broadcast data packet in the Bluetooth broadcast mode through the embodiments of the disclosure, thus acquiring and displaying the therapy data in the broadcast data packet, and compared with the prior art, the terminal device and the medical instrument do not need to be paired one to one, so that the device is simple in operation and high in transmission efficiency, and may be suitable for various application scenarios. Moreover, for an elderly user, since a complicated Bluetooth pairing process is not needed, the device is obviously more conducive to operation of the elderly user, and convenient for remote extraction of therapy data of the user.

Optionally, the device further includes: a sending module, configured to send a scanning request, the scanning request containing a data type instruction needed by a terminal, wherein the data type instruction is used for indicating designated therapy data needed to be acquired by the terminal; wherein the receiving module is further configured to receive a new broadcast data packet; and the parsing module is further configured to, according to the data packet parsing method of the standard Bluetooth protocol, parse the new broadcast data packet to acquire a content filled into an AD Type segment in the new broadcast data packet; and if the content filled into the AD Type segment is the designated data type, acquire a content filled into an AD data segment in the new broadcast data packet, decode the content according to the preset decoding rule, and then acquire the designated therapy data. The terminal device may send the scanning request containing the data type instruction needed by the terminal according to data requirements of the terminal device itself to acquire the designated medical data, thus meeting data requirements of different external terminals.

Optionally, the preset decoding rule includes: converting an ASCII code character string into a corresponding hexadecimal character string; converting the hexadecimal character string into a decimal character string; and according to a sequence of each character in the decimal character string, sequentially determining data information of a plurality of statistical data contents including a data sub-packet indicating bit, a total frame number of data, a current frame number and the therapy data, wherein the data information of the statistical data contents is acquired by sequential arrangement according to a preset sequence. A confidentiality of the therapy data during transmission may be improved through the preset coding rule in the embodiments of the disclosure. In addition, sub-packet transmission may be performed for a condition that one broadcast data packet cannot completely cover a large amount of data information, and the sub-packet indicating bit, the total frame number of data and the current frame number are set in the broadcast data packet, so that the terminal device determines whether the complete broadcast data packet is received accordingly.

Optionally, the therapy data includes: a serial number of the medical instrument, manufacturer information of the medical instrument, and statistical data and/or real-time data of the medical instrument within a statistical period. The above therapy data is acquired in the embodiments of the disclosure, so that a doctor may adjust a therapeutic schedule of a patient through the above data.

According to a seventh aspect of the embodiments of disclosure, a device for receiving medical instrument data is provided, which includes a processor, a memory and a computer program stored on the memory and executable on the processor, wherein when executed by the processor, the computer program implements the above method for receiving the medical instrument data.

According to an eighth aspect of the embodiments of disclosure, a computer-readable storage medium is provided, wherein a computer program is stored on the computer-readable storage medium, and when executed by a processor, the computer program implements the above method for receiving the medical instrument data.

According to the disclosure, the medical instrument acquires the therapy data, according to the data packet encapsulation method of the standard Bluetooth protocol, the data length is filled into the Len segment of the Bluetooth data packet, the designated data type is preset and filled into the AD Type segment, the therapy data is coded according to the preset coding rule, and then the coded therapy data is filled into the AD data segment, so that the broadcast data packet is formed; and the broadcast data packet is broadcasted according to the preset period in the Bluetooth broadcast mode. According to the technical solution of the disclosure, the therapy data of the medical instrument is sent to the terminal device in the Bluetooth broadcast mode, without needing to pair the terminal device with the respirator one to one, and compared with the conventional respirator data transmission scheme, the disclosure is simple in operation and high in transmission efficiency, and may be suitable for various application scenarios. Moreover, for the elderly user, since the complicated Bluetooth pairing process is not needed, the disclosure is obviously more conducive to operation of the elderly user, and convenient for the remote extraction of the therapy data of the user.

Other features and advantages of the disclosure will become clear through the following detailed description of the exemplary embodiments of the disclosure with reference to the accompanying drawings.

BRIEF DESCRIPTION OF THE DRAWINGS

The accompanying drawings combined in the specification and constituting a part of the specification illustrate the embodiments of the disclosure, and are used for explaining the principle of the disclosure with the description of the accompanying drawings.

DETAILED DESCRIPTION OF THE EMBODIMENTS

Figure 1:
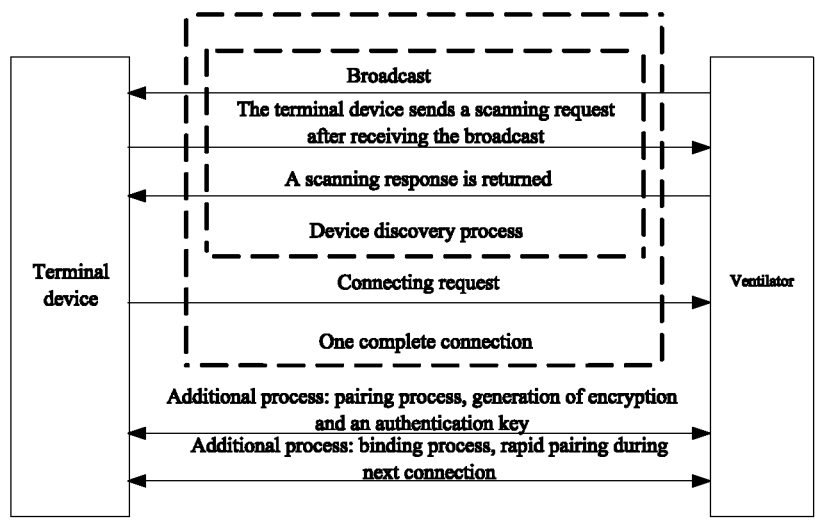
FIG. 1 is a schematic flow chart of a respirator data transmission process in the prior art.
Figure 2:
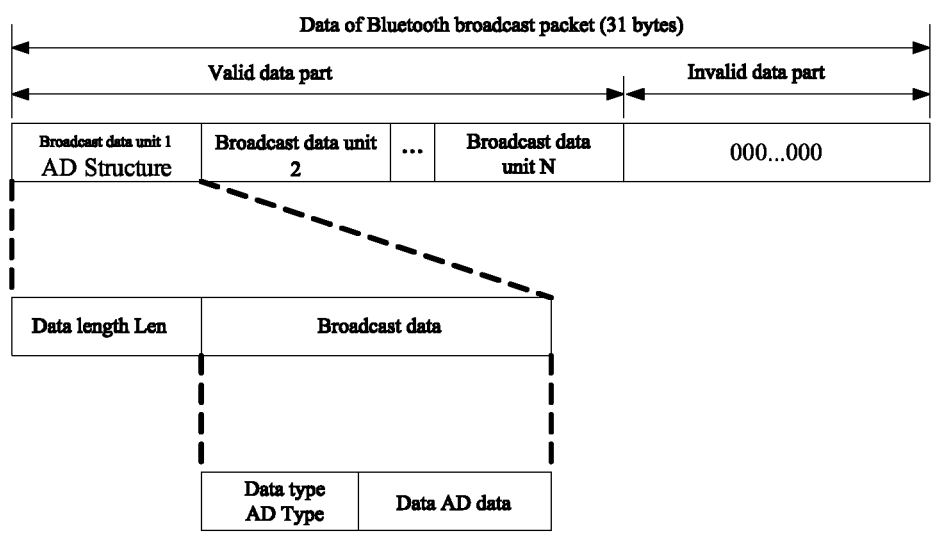
FIG. 2 is a diagram of a conventional Bluetooth data format.

The various exemplary embodiments of the disclosure are now described in detail with reference to the accompanying drawings. It should be noted that the relative arrangement of components and steps, the numeric expressions and the values described in these embodiments do not limit the scope of the disclosure, unless otherwise specified.

The following description to at least one exemplary embodiment is only illustrative in fact and is in no way intended to limit the disclosure, and the application and use thereof.

Technologies, methods and devices known to those of ordinary skills in the relevant arts may not be discussed in detail, but the technologies, the methods and the devices should be considered as a part of the specification where appropriate.

Any specific value should be interpreted as being only exemplary and should not be used as a limitation in all examples presented and discussed herein. Therefore, other examples of the exemplary embodiments may have different values.

It should be noted that similar reference numerals and letters represent similar items in the following accompanying drawings. Therefore, once certain item is defined in one accompanying drawing, the item does not need to be further discussed in the following accompanying drawings.

<Hardware Configuration>

Figure 3:
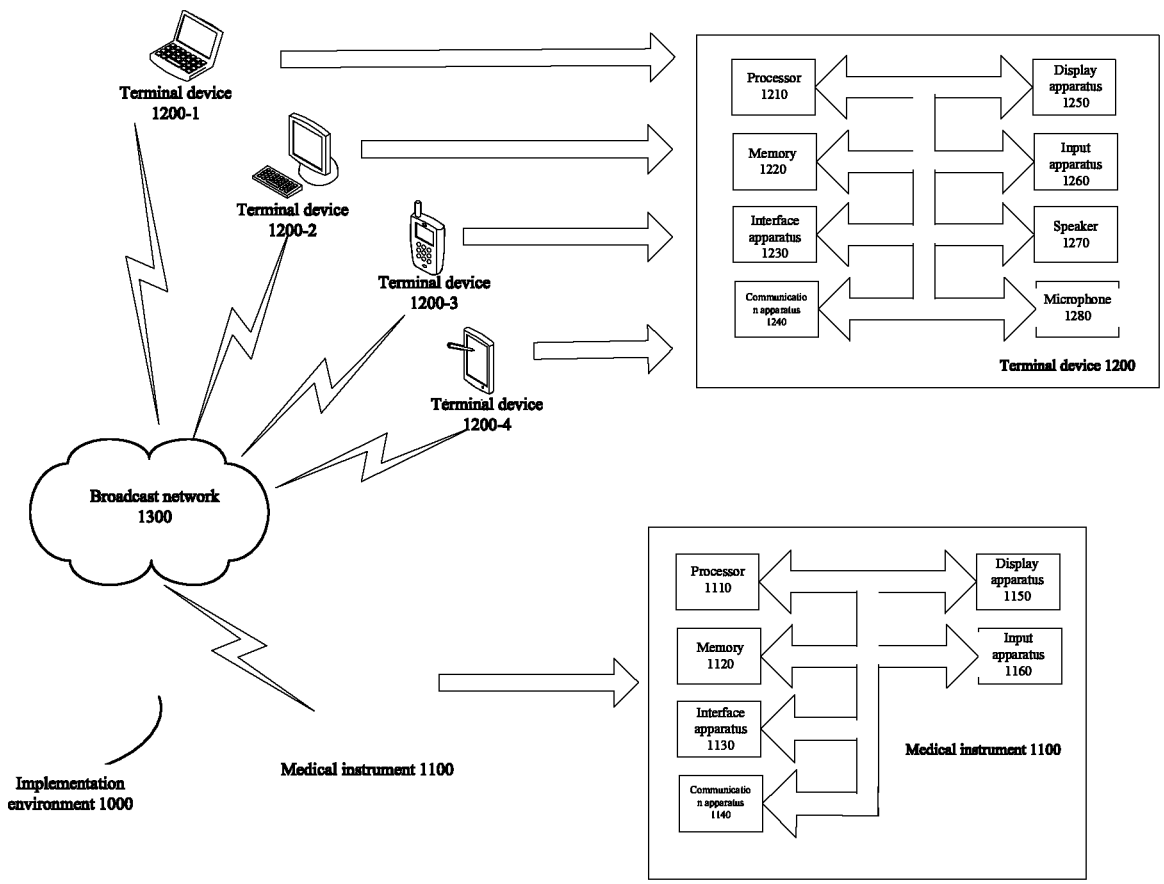
FIG. 3 shows a block diagram of an example of a hardware configuration of an implementation environment for realizing the embodiments of the disclosure.

FIG. 3 shows a block diagram of an example of a hardware configuration of an implementation environment for realizing the embodiments of the disclosure.

As shown in FIG. 3, the implementation environment 1000 includes a medical instrument 1100, a terminal device 1200 and a broadcast network 1300.

As shown in FIG. 3, the medical instrument 1100 may include a processor 1110, a memory 1120, an interface apparatus 1130, a communication apparatus 1140, a display apparatus 1150 and an input apparatus 1160. Although a respirator 1100 may also include a speaker, a mask and other components, these components are not related to the disclosure, thus being omitted herein. The processor 1110 may be, for example, a central processing unit CPU, a microprocessor unit MCU, and the like. The memory 1120 includes, for example, a ROM (Read Only Memory), a RAM (Random Access Memory), a nonvolatile memory such as a hard disk, and the like. The interface apparatus 1130 includes, for example, a USB interface, a serial interface, and the like. The communication apparatus 1140 may be, for example, a Bluetooth module capable of performing broadcast communication. The display apparatus 1150 is, for example, a liquid crystal display screen. The input apparatus 1160 may include, for example, a touch screen, a keyboard, and the like.

The terminal device 1200 may be a portable computer (1200-1), a desktop computer (1200-2), a mobile phone (1200-3), a tablet computer (1200-4), and the like. As shown in FIG. 3, the terminal device 1200 may include a processor 1210, a memory 1220, an interface apparatus 1230, a communication apparatus 1240, a display apparatus 1250, an input apparatus 1260, a speaker 1270, a microphone 1280, and the like. The processor 1210 may be a central processing unit CPU, a microprocessor unit MCU, and the like. The memory 1220 includes, for example, a ROM (Read Only Memory), a RAM (Random Access Memory), a nonvolatile memory such as a hard disk, and the like. The interface apparatus 1230 includes, for example, a USB interface, a headphone jack, and the like. The communication apparatus 1240 may be a Bluetooth module capable of performing broadcast communication. The display apparatus 1250 is, for example, a liquid crystal display screen, a touch display screen, and the like. The input apparatus 1260 may include, for example, a touch screen, a keyboard, and the like. A user may input/output voice information through the speaker 1270 and the microphone 1280.

In the implementation environment 1000 shown in FIG. 3, the medical instrument 1100 may broadcast through the broadcast network 1300, and the terminal devices 1200-1, 1200-2, 1200-3 and 1200-4 may receive information broadcasted by the respirator 1100 through the broadcast network. A plurality of medical instruments 1100 may also be provided (not shown in FIG. 3). In the embodiment, the medical instruments 1100 and the terminal devices 1200 may transmit therapy data in a one-to-one manner, or may transmit the therapy data in a many-to-one manner, a one-to-many manner, or a many-to-many manner, which is not specifically limited herein. The broadcast networks mentioned in the figure are all in a broadcast mode based on a Bluetooth protocol.

The implementation environment 1100 shown in FIG. 3 is only illustrative and is in no way intended to limit the disclosure, and an application or use thereof. Applied in the embodiment of the disclosure, the memory 1120 of the medical instrument 1100 is used for storing an instruction, and the instruction is used for controlling the processor 1110 to operate so as to execute a method for sending any medical instrument data provided by the embodiment of the disclosure. The method incudes: starting a Bluetooth module; acquiring therapy data of a medical instrument; according to a data packet encapsulation method of a standard Bluetooth protocol, filling a data length of the therapy data into a data length Len segment of a Bluetooth data packet, presetting a designated data type and filling the designated data type into a data type AD Type segment, coding the therapy data according to a preset coding rule, and then filling the coded therapy data into a data AD data segment, so that a broadcast data packet is formed; and broadcasting the broadcast data packet according to a preset period in a Bluetooth broadcast mode. The preset period in the embodiment may be set according to an actual condition, for example, the specific broadcast mode of the embodiment is performed 10 times or 20 times every 1 minute, 2 minutes or 5 minutes, and a normal code-matching Bluetooth broadcast may be sent according to a code-matching flow of the Bluetooth protocol during the rest of the period, so that the respirator transmits a large amount of therapy data after code-matching connection.

In addition, the memory 1220 of the terminal device 1200 is used for storing an instruction, and the instruction is used for controlling the processor 1210 to operate so as to execute a method for receiving any medical instrument data provided by the embodiment of the disclosure. The method incudes: receiving a broadcast data packet in a Bluetooth broadcast mode; according to a data packet parsing method of a standard Bluetooth protocol, parsing the broadcast data packet to acquire a content filled into a data type AD Type segment in the broadcast data packet; and if the content filled into the AD Type segment is a designated data type, acquiring a content filled into a data AD data segment in the broadcast data packet, decoding the content according to a preset decoding rule, and then acquiring therapy data of the medical instrument; and displaying the therapy data.

Those skilled in the art should understand that although a plurality of apparatuses of the medical instrument 1100 and a plurality of apparatuses of the terminal device 1200 are shown in FIG. 3, the disclosure may only refer to some of the apparatuses, for example, the medical instrument 1100 only refers to the processor 1110, the memory 1120 and the communication apparatus 1140, or the terminal device 1200 only refers to the processor 1210, the memory 1220 and the communication apparatus 1240, and the like. Those skilled in the art may design the instruction according to the solutions disclosed by the disclosure. How the instruction controls the processor to operate is well known in the art, thus being not described in detail herein.

First Embodiment

<Method>

Figure 4:
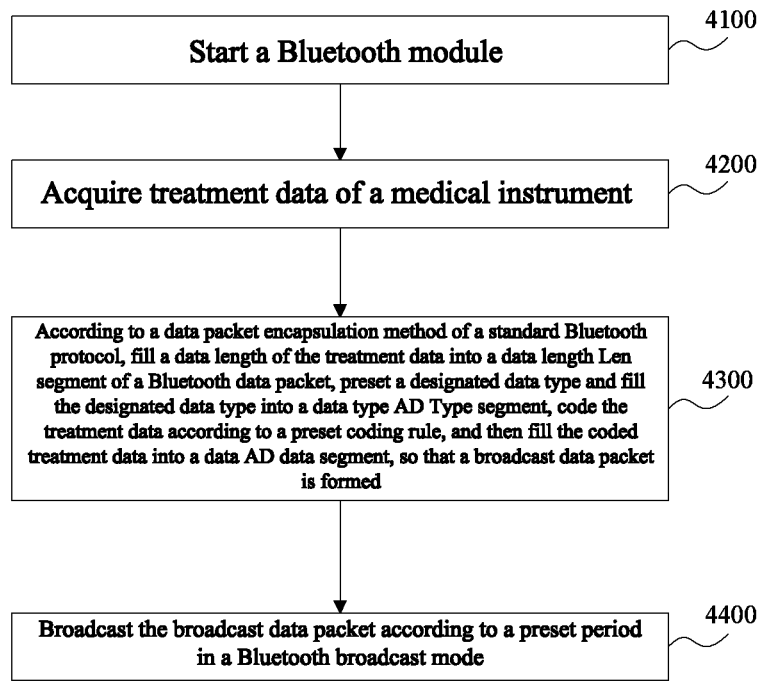
FIG. 4 shows a schematic flow chart of a method for sending medical instrument data according to the first embodiment of the disclosure.

FIG. 4 shows a schematic flow chart of a method for sending medical instrument data according to the first embodiment of the disclosure.

The method for sending the medical instrument data provided in the embodiment is implemented based on a Bluetooth protocol, and may be specifically executed by a medical instrument with a Bluetooth broadcast module, or by a Bluetooth device connected with the medical instrument. Hardware configuration thereof may refer to the above FIG. 3 for details, thus being not repeated herein.

As shown in FIG. 4, the method for sending the medical instrument data may include the following steps.

In step 4100, a Bluetooth module is started.

Specifically, the medical instrument may be preset to enable a Bluetooth function by default after being started up, or the Bluetooth module may be started before encapsulating a broadcast data packet, or the Bluetooth module may be started after encapsulating the broadcast data packet and before broadcasting the broadcast data packet. The step is not specifically limited in the embodiment.

In step 4200, therapy data of a medical instrument is acquired.

In step 4300, according to a data packet encapsulation method of a standard Bluetooth protocol, a data length of the therapy data is filled into a data length Len segment of the Bluetooth data packet, a designated data type is preset and filled into a data type AD Type segment, the therapy data is coded according to a preset coding rule, and then the coded therapy data is filled into a data AD data segment, so that a broadcast data packet is formed.

As described in the prior art, an AD Structure of the Bluetooth data packet consists of a length Len, a type AD Type and data AD data. In the embodiment, the predesignated data type is set as 0xFF, and 0xFF is filled into the AD Type segment of the Bluetooth data packet to self-define Bluetooth broadcast data. In other feasible embodiments, the predesignated data type may also be other types, which is not specifically limited herein.

The therapy data may include: a serial number of the medical instrument, manufacturer information of the medical instrument, and statistical data and/or real-time data of the medical instrument within a statistical period. The statistical period refers to a historical use period of the medical instrument. The statistical data of the medical instrument within the statistical period is a statistical analysis result of all therapy data of the medical instrument within the historical use period. The real-time data of the medical instrument refers to real-time therapy data of the medical instrument within a current use period.

Specifically, the preset coding rule is a preset method for coding the therapy data, so as to improve a confidentiality of the therapy data during transmission. In the embodiment, the preset coding rule may be set as, for example: according to data information of a plurality of statistical data contents including a data sub-packet indicating bit, a total frame number of data, a current frame number and the therapy data, sequentially generating a decimal character string; converting the decimal character string into a hexadecimal character string; and sequentially converting each character in the hexadecimal character string into a corresponding ASCII code to acquire a corresponding ASCII code character string, wherein the data information of the statistical data contents is acquired by sequential arrangement according to a preset sequence. The coding rule in actual use is not specifically limited in the embodiment.

For example, the therapy data includes the serial number of the medical instrument, the manufacturer information of the medical instrument, and the statistical data of the medical instrument within the statistical period. Information contained in the statistical data may include: a proportion of effective treatment days, an average use time per day, a P95 (an average pressure value of a respirator in 95% of time within a statistical period of the respirator), an AHI (a number of times of apnea and hypopnea in sleep per hour), a proportion of high leakage time (>90 LPM) and a Best 30. Specific description of the information and a number of bytes occupied respectively are shown in Table 1 below.

TABLE 1

| Statistical data content | Number of bytes | Description |
|---|---|---|
| Proportion of effective treatment days | 2 | Treatment time of user with respirator >= ratio of number of days with 4 use hours to total number of days of statistical period |
| Average use time per day | 2 | Average value of daily use time of respirator by user within statistical period |
| P95 | 2 | Average value of P95 within statistical period |
| AHI | 2 | Average value of AHI within statistical period |

TABLE 1-continued

| Statistical data content | Number of bytes | Description |
|---|---|---|
| Proportion of high leakage time | 2 | Average value of proportion of daily leakage time within statistical period |
| Best 30 | 2 | Use time of device by user in a continuous 30-day time window within statistical period >= maximum number of days with 4 use hours |

According to the therapy data in the embodiment, the data information of the statistical data contents is sequentially extracted according to a preset or designated rule only, and the statistical data contents and the descriptions are not transmitted in the data packet. For example, if the proportion of the effective treatment days is 70%, and the average use time per day is 7.5 hours, in the data packet of the embodiment, the data information 70 and 75 are extracted only. In other words, a data string 7075 is finally extracted. In order to save a data volume transmitted, the content and the description of each data are not transmitted.

For example, the data sub-packet indicating bit is 0 or false (which represents no sub-packet), the total frame number of the data is 1, the current frame number is 1, the manufacturer information of the medical instrument is "YH", the serial number of the medical instrument is 100, the proportion of the effective treatment days is 70%, the average use time per day is 7.5 hours, the P95 is 15 hPa, a value of the AHI is 6, the proportion of the high leakage time is 22%, and a value of the Best 30 is 21.

In the Broadcast data packet of the embodiment, the data information 0, 1, 1, YH, 100, 70, 75, 15, 06, 22 and 21 are extracted only, and the contents corresponding to the data information and the descriptions are not extracted. In other words, the character string acquired by the sequential arrangement according to the preset sequence is 011YH100707515062221. The data information is converted into the corresponding ASCII code character string according to the preset coding rule of the embodiment, which means that the therapy data filled into the AD Data segment of the Bluetooth data packet is: 30H 31H 31H 59H 48H 31H 30H 30H 37H 30H 37H 35H 31H 35H 30H 36H 32H 32H 32H 31H.

For another example, the data sub-packet indicating bit is 0 or false (which represents no sub-packet), the total frame number of the data is 1, the current frame number is 1, the manufacturer information of the medical instrument is "YH", the serial number of the medical instrument is 100, a real-time traffic is 10 L/min, and a real-time pressure value is 4 hPa. In the Broadcast data packet of the embodiment, the data information 0, 1, 1, YH, 100, 10 and 04 are extracted only, and the contents corresponding to the data information and the descriptions are not extracted. In other words, the character string acquired by the sequential arrangement according to the preset sequence is 011YH1001004. The data information is converted into the corresponding ASCII code character string according to the preset coding rule of the embodiment, which means that the therapy data filled into the AD Data segment of the Bluetooth data packet is: 30H 31H 31H 59H 48H 31H 30H 30H 31H 30H 30H 34H.

In an example, in the method of the embodiment, when broadcasting the broadcast data packet, the medical instrument may further receive a scanning request from an external terminal, and the scanning request contains a data type instruction needed by the external terminal, wherein the data type instruction is designated therapy data needed to be acquired by the external terminal. According to the data type instruction in the scanning request, the medical instrument acquires new therapy data corresponding to the medical instrument, according to the data packet encapsulation method of the standard Bluetooth protocol, a data length of the new therapy data is filled into the Len segment of the Bluetooth data packet, the designated data type is preset and filled into the AD Type segment, the new therapy data is coded according to the preset coding rule, and then the coded new therapy data is filled into the AD data segment, so that a new broadcast data packet is formed. The new broadcast data packet is broadcasted according to the preset period in the Bluetooth broadcast mode.

In the example, the external terminal may instruct the medical instrument to acquire the designated medical data through the scanning request. For example, the medical instrument is a respirator, and the external terminal is intended to acquire treatment statistical data of the respirator including a treatment pressure, an apnea hypopnea index, blood oxygen information, a respiratory rate, a minute ventilation, and the like.

After receiving the scanning request, the respirator acquires designated treatment statistical data of 140 bytes according to the data type instruction in the scanning request, and a length of the data exceeds a length requirement of 31 bytes on broadcast data. One broadcast data packet cannot completely cover the information and needs to be transmitted in a sub-packet manner, so that the data sub-packet indicating bit is set as 1 or TUBE when the designated treatment statistical data is coded according to the preset coding rule. The total frame number of the data is used for indicating a total frame number of the broadcast data, and the current frame number is used for indicating which frames of the broadcast data are contained in the broadcast data. Therefore, the terminal device determines whether the complete broadcast data packet is received accordingly.

For example, a sub-packet is designed as follows: single frame data is 20, a total frame number is 7, and a data format thereof is shown in Table 2 below.

TABLE TWO

| | Broadcast data | | | |
|---|---|---|---|---|
| Data type | Whether sub-packet exists | Total frame number | Current frame number | Data area |
| 0xFF | TURE | 7 | 1 . . . 7 | xxx (20 bytes) |

After acquiring the ASCII code character string corresponding to the new therapy data, the ASCII code character string is filled into the AD data segment of the Bluetooth data packet to form the new broadcast data packet, and the new broadcast data packet is broadcasted according to the preset period in the Bluetooth broadcast mode.

A forming process of the broadcast data packet is described above by the example. After the broadcast data packet is formed, step 4400 is implemented.

In step 4400, the broadcast data packet is broadcasted according to the preset period in the Bluetooth broadcast mode.

Generally, the medical instrument is externally connected with a power source for use without needing to consider power consumption. Therefore, a broadcast interval is set to be the shortest, so as to achieve the purpose that the external terminal may rapidly acquire the therapy data.

Specifically, the Bluetooth broadcast mode includes: a directional connectible mode, a directional non-connectible mode, a non-directional connectible mode, and a non-directional non-connectible mode. The terminal device at a receiving end may acquire the therapy data without needing to establish Bluetooth connection with the medical instrument, which means that the data may be transmitted by only discovering a Bluetooth device. Numbers of the medical instruments and the terminal devices are not limited.

It should be noted that in the embodiment, the medical instrument broadcasting the broadcast data packet in the preset period belongs to small data transmission. Meanwhile, the medical instrument may also establish normal Bluetooth connection with the external terminal to perform large data transmission.

According to the method for sending the medical instrument data in the embodiment, the Bluetooth module is started; the therapy data of the medical instrument is acquired; according to the data packet encapsulation method of the standard Bluetooth protocol, the data length of the therapy data is filled into the Len segment of the Bluetooth data packet, the designated data type is preset and filled into the AD Type segment, the therapy data is coded according to the preset coding rule, and then the coded therapy data is filled into the AD data segment, so that the broadcast data packet is formed; and the broadcast data packet is broadcasted according to the preset period in the Bluetooth broadcast mode.

According to the technical solution of the embodiment, the therapy data of the medical instrument is sent to the terminal device in the Bluetooth broadcast mode, without needing to pair the terminal device with the medical instrument one to one, and compared with the conventional medical instrument data transmission scheme, the method is simple in operation and high in transmission efficiency, and may be suitable for various application scenarios. Moreover, for an elderly user, since a complicated Bluetooth pairing process is not needed, the method is obviously more conducive to operation of the elderly user, and convenient for remote extraction of therapy data of the user.

<Device>

Figure 5:
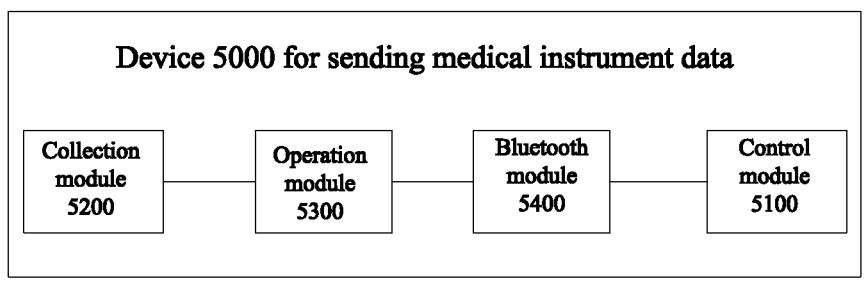
FIG. 5 shows a schematic block diagram of a device for sending medical instrument data according to the first embodiment of the disclosure.

FIG. 5 shows a schematic block diagram of a device for sending medical instrument data according to the first embodiment of the disclosure.

As shown in FIG. 5, the device 5000 for sending the medical instrument data may include the following modules.

A control module 5100 is configured to start a Bluetooth module 5400.

A collection module 5200 is configured to extract therapy data of a medical instrument.

An operation module 5300 is configured to, according to a data packet encapsulation method of a standard Bluetooth protocol, fill a data length into a Len segment of a Bluetooth data packet, preset a designated data type and fill the designated data type into an AD Type segment, code the therapy data according to a preset coding rule, and then fill the coded therapy data into an AD data segment, so that a broadcast data packet is formed.

The Bluetooth module 5400 is configured to broadcast the broadcast data packet according to a preset period in a Bluetooth broadcast mode.

Further, the Bluetooth module 5400 may further be configured to, when broadcasting the broadcast data packet, receive a scanning request from an external terminal.

The operation module 5300 may further be configured to parse a data type instruction contained in the scanning request, wherein the data type instruction is designated therapy data needed to be acquired by the external terminal.

Correspondingly, the collection module 5200 may further be configured to, according to a parsing result of the operation module 5300, collect new therapy data corresponding to the medical instrument. The operation module 5300 may further be configured to, according to the data packet encapsulation method of the standard Bluetooth protocol, fill a data length of the new therapy data into the Len segment of the Bluetooth data packet, preset the designated data type and fill the designated data type into the AD Type segment, code the new therapy data according to the preset coding rule, and then fill the coded new therapy data into the AD data segment, so that a new broadcast data packet is formed.

The Bluetooth module 5400 may further be configured to broadcast the new broadcast data packet according to the preset period in the Bluetooth broadcast mode.

The therapy data includes: a serial number of the medical instrument, manufacturer information of the medical instrument, and statistical data and/or real-time data of the medical instrument within a statistical period.

It should be noted that the preset coding rule includes: according to data information of a plurality of statistical data contents including a data sub-packet indicating bit, a total frame number of data, a current frame number and the therapy data, sequentially generating a decimal character string; converting the decimal character string into a hexadecimal character string; and sequentially converting each character in the hexadecimal character string into a corresponding ASCII code to acquire a corresponding ASCII code character string, wherein the data information of the statistical data contents is acquired by sequential arrangement according to a preset sequence.

In an actual application, the Bluetooth broadcast mode includes: a directional connectible mode, a directional non-connectible mode, a non-directional connectible mode, and a non-directional non-connectible mode, which is not specifically limited in the embodiment.

The device for sending the medical instrument data in the embodiment may be used for executing the technical solution of the above method embodiment, and has similar implementation principles and technical effects, thus being not repeated herein.

Those skilled in the art should understand that the device 5000 for sending the medical instrument data may be implemented in various ways. For example, the device 5000 for sending the medical instrument data may be implemented by configuring a processor through an instruction. For example, the instruction may be stored in a ROM, and when the device is started up, the instruction is read from the ROM into a programmable device to implement the device 5000 for sending the medical instrument data. For example, the device 5000 for sending the medical instrument data may be fixed into a special device (such as an ASIC). The device 5000 for sending the medical instrument data may be divided into mutually independent units, or the units may be combined to implement the device 5000 for sending the medical instrument data. The device 5000 for sending the medical instrument data may be implemented by one of the above implementation ways, or may be implemented by a combination of two or more of the above implementation ways.

Correspondingly, the embodiment of the disclosure further provides a device for sending medical instrument data, which includes a processor, a memory and a computer program stored on the memory and executable on the processor, and when executed by the processor, the computer program implements the steps of the above method for sending the medical instrument data.

Correspondingly, the embodiment of the disclosure further provides a computer-readable storage medium, wherein a computer program is stored on the computer-readable storage medium, and when executed by a processor, the computer program implements the steps of the above method for sending the medical instrument data according to the embodiment.

The first embodiment of the disclosure has been described above with reference to the drawings. The medical instrument acquires the therapy data, according to the data packet encapsulation method of the standard Bluetooth protocol, the data length is filled into the Len segment of the Bluetooth data packet, the designated data type is preset and filled into the AD Type segment, the therapy data is coded according to the preset coding rule, and then the coded therapy data is filled into the AD data segment, so that the broadcast data packet is formed; and the broadcast data packet is broadcasted according to the preset period in the Bluetooth broadcast mode. The therapy data of the medical instrument is sent to the terminal device in the Bluetooth broadcast mode, without needing to pair the terminal device with the medical instrument one to one, and compared with the conventional medical instrument data transmission scheme, the device is simple in operation and high in transmission efficiency, and may be suitable for various application scenarios. Moreover, for an elderly user, since a complicated Bluetooth pairing process is not needed, the device is obviously more conducive to operation of the elderly user, and convenient for remote extraction of therapy data of the user.

Second Embodiment

<Method>

Figure 6:
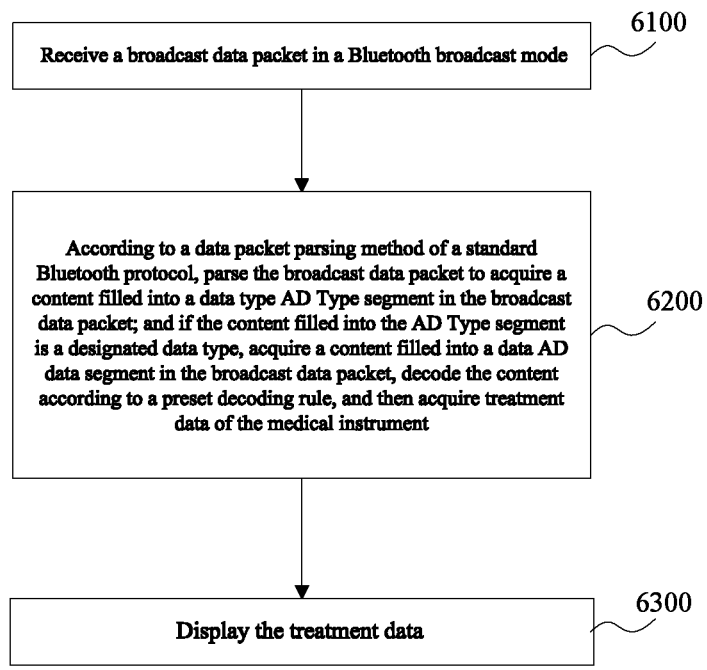
FIG. 6 shows a schematic flow chart of a method for receiving medical instrument data according to the second embodiment of the disclosure.

FIG. 6 shows a schematic flow chart of a method for receiving medical instrument data according to the second embodiment of the disclosure.

The method for receiving the medical instrument data in the embodiment is implemented based on a Bluetooth protocol. The method may be specifically executed by a terminal device with a Bluetooth broadcast module, or by a Bluetooth device connected with the terminal device. Hardware configuration thereof may refer to the above FIG. 3 for details, thus being not repeated herein.

As shown in FIG. 6, the method for receiving the medical instrument data includes the following steps.

In step 6100, a broadcast data packet is received in a Bluetooth broadcast mode. Specifically, the Bluetooth broadcast mode includes: a directional connectible mode, a directional non-connectible mode, a non-directional connectible mode, and a non-directional non-connectible mode. The terminal device may acquire the therapy data without needing to establish Bluetooth connection with a medical instrument, which means that the data may be transmitted by only discovering the Bluetooth device. Numbers of the medical instruments and the terminal devices are not limited in the data transmission mode.

In step 6200, according to a data packet parsing method of a standard Bluetooth protocol, the broadcast data packet is parsed to acquire a content filled into a data type AD Type segment in the broadcast data packet; and if the content filled into the AD Type segment is a designated data type, a content filled into a data AD data segment in the broadcast data packet is acquired, the content is decoded according to a preset decoding rule, and then therapy data of the medical instrument is acquired.

In the embodiment, the predesignated data type is 0xFF. After parsing that the content filled into the AD Type segment in the broadcast data packet is 0xFF, the terminal device may determine that the broadcast data packet contains the broadcast data packet of the therapy data of the medical instrument. In other feasible embodiments, the predesignated data type may also be other types, which is not specifically limited herein.

The therapy data may include: a serial number of the medical instrument, manufacturer information of the medical instrument, and statistical data and/or real-time data of the medical instrument within a statistical period.

Specifically, the preset decoding rule is a preset method for decoding the therapy data, so as to improve a confidentiality of the therapy data during transmission. In the embodiment, the preset decoding rule may be set as, for example: converting an ASCII code character string into a corresponding hexadecimal character string; converting the hexadecimal character string into a decimal character string; and according to a sequence of each character in the decimal character string, sequentially determining data information of a plurality of statistical data contents including a data sub-packet indicating bit, a total frame number of data, a current frame number and the therapy data, wherein the data information of the statistical data contents is acquired by sequential arrangement according to a preset sequence. The decoding rule in actual use is not specifically limited in the embodiment.

For example, the acquired content filled into the AD data segment in the broadcast data packet is 30H 31H 31H 59H 48H 31H 30H 30H 31H 30H 30H 34H. After decoding according to the preset decoding rule, the acquired character string is 011YH1001004. According to the sequence of each character in the character string, the following contents may be sequentially determined: the data sub-packet indicating bit is 0 or false, the total frame number of the data is 1, the current frame number is 1, the manufacturer information of the medical instrument is "YH", the serial number of the medical instrument is 100, a real-time traffic is 10 L/min, and a real-time pressure value is 4 hPa.

For example, the acquired content filled into the AD data segment in the broadcast data packet is 30H 31H 31H 59H 48H 31H 30H 30H 37H 30H 37H 35H 31H 35H 30H 36H 32H 32H 32H 31H. After decoding according to the preset decoding rule, the acquired character string is 011YH100707515062221. According to the sequence of each character in the character string, the following contents may be sequentially determined: the data sub-packet indicating bit is 0 or false, the total frame number of the data is 1, the current frame number is 1, the manufacturer information of the medical instrument is "YH", the serial number of the medical instrument is 100, a proportion of effective treatment days is 70%, an average use time per day is 7.5 hours, a P95 is 15 hPa, a value of an AHI is 6, a proportion of a high leakage time is 22%, and a value of a Best 30 is 21.

In an example, the terminal device may further send a scanning request, and the scanning request contains a data type instruction needed by a terminal, wherein the data type instruction is used for indicating designated therapy data needed to be acquired by the terminal.

For example, the medical instrument is a respirator, and the terminal is intended to acquire treatment statistical data of the respirator including a treatment pressure, an apnea hypopnea index, blood oxygen information, a respiratory rate, a minute ventilation, and the like. The data type instruction may be contained in the scanning request to be sent to the respirator.

The terminal device receives a new broadcast data packet, according to the data packet parsing method of the standard Bluetooth protocol, the new broadcast data packet is parsed to acquire a content filled into an AD Type segment in the new broadcast data packet; and if the content filled into the AD Type segment is the designated data type, a content filled into an AD data segment in the new broadcast data packet is acquired, the content is decoded according to the preset decoding rule, and then the designated therapy data is acquired.

The terminal may determine whether the therapy data is transmitted in a sub-packet manner according to the data sub-packet indicating bit in the broadcast data packet. If yes, the scanning request is sent again to continuously receive the therapy data until all sub-packet data is received. The therapy data in the sub-packet data is acquired.

After acquiring the therapy data, step 6300 is implemented.

In step 6300, the therapy data is displayed.

The terminal may display the acquired therapy data through a display apparatus, such as a display screen.

According to the method for receiving the medical instrument data in the embodiment, the terminal device receives the broadcast data packet in the Bluetooth broadcast mode, and parses the broadcast data packet according to the data packet parsing method of the standard Bluetooth protocol. After the acquired content filled into the AD Type segment in the broadcast data packet is determined to be the designated data type, the content filled into the AD data segment in the broadcast data packet is acquired and decoded according to the preset decoding rule, and then the therapy data is acquired and displayed. Compared with the prior art, the terminal device does not need to be paired with the medical instrument one to one according to the method, so that the method is simple in operation and high in transmission efficiency.

<Device>

Figure 7:
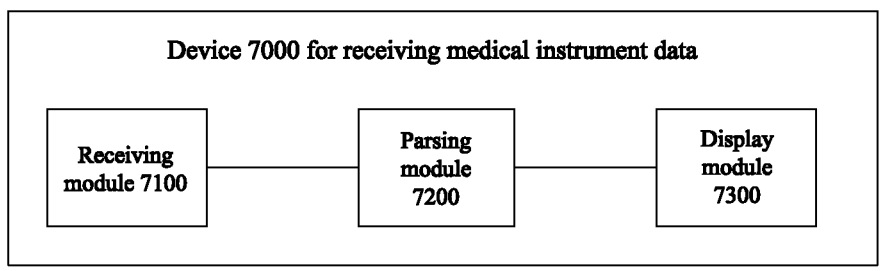
FIG. 7 shows a schematic block diagram of a device for receiving medical instrument data according to the disclosure.

FIG. 7 shows a schematic block diagram of a device for receiving medical instrument data according to the disclosure.

As shown in FIG. 7, the device 7000 for receiving the medical instrument data may include the following modules.

A receiving module 7100 is configured to receive a broadcast data packet in a Bluetooth broadcast mode.

A parsing module 7200 is configured to, according to a data packet parsing method of a standard Bluetooth protocol, parse the broadcast data packet to acquire a content filled into an AD Type segment in the broadcast data packet; and if the content filled into the AD Type segment is a designated data type, acquire a content filled into an AD data segment in the broadcast data packet, decode the content according to a preset decoding rule, and then acquire therapy data.

A display module 7300 is configured to display the therapy data.

Optionally, the device 7000 for receiving the medical instrument data further includes: a sending module configured to send a scanning request, and the scanning request contains a data type instruction needed by a terminal, wherein the data type instruction is used for indicating designated therapy data needed to be acquired by the terminal.

Correspondingly, the receiving module 7100 may further be configured to receive a new broadcast data packet. The parsing module 7200 may further be configured to, according to the data packet parsing method of the standard Bluetooth protocol, parse the new broadcast data packet to acquire a content filled into an AD Type segment in the new broadcast data packet; and if the content filled into the AD Type segment is the designated data type, acquire a content filled into an AD data segment in the new broadcast data packet, decode the content according to the preset decoding rule, and then acquire the designated therapy data.

The therapy data includes: a serial number of the medical instrument, manufacturer information of the medical instrument, and statistical data and/or real-time data of the medical instrument within a statistical period.

The preset decoding rule includes: converting an ASCII code character string into a corresponding hexadecimal character string; converting the hexadecimal character string into a decimal character string; and according to a sequence of each character in the decimal character string, sequentially determining data information of a plurality of statistical data contents including a data sub-packet indicating bit, a total frame number of data, a current frame number and the therapy data, wherein the data information of the statistical data contents is acquired by sequential arrangement according to a preset sequence.

In an actual application, the Bluetooth broadcast mode includes: a directional connectible mode, a directional non-connectible mode, a non-directional connectible mode, and a non-directional non-connectible mode, which is not specifically limited in the embodiment.

The device for receiving the medical instrument data in the embodiment may be used for executing the technical solution of the above method embodiment, and has similar implementation principles and technical effects, thus being not repeated herein.

Those skilled in the art should understand that the device 7000 for receiving the medical instrument data may be implemented in various ways. For example, the device 7000 for receiving the medical instrument data may be implemented by configuring a processor through an instruction. For example, the instruction may be stored in a ROM, and when the device is started up, the instruction is read from the ROM into a programmable device to implement the device 7000 for receiving the medical instrument data. For example, the device 7000 for receiving the medical instrument data may be cured into a special device (such as an ASIC). The device 7000 for receiving the medical instrument data may be divided into mutually independent units, or the units may be combined to implement the device 7000 for receiving the medical instrument data. The device 7000 for receiving the medical instrument data may be implemented by one of the above implementation ways, or may be implemented by a combination of two or more of the above implementation ways.

Correspondingly, the embodiment of the disclosure further provides a device for receiving medical instrument data, which includes a processor, a memory and a computer program stored on the memory and executable on the processor, and when executed by the processor, the computer program implements the above method for receiving the medical instrument data.

Correspondingly, the embodiment of the disclosure further provides a computer-readable storage medium, wherein a computer program is stored on the computer-readable storage medium, and when executed by a processor, the computer program implements the above method for receiving the medical instrument data.

The second embodiment of the disclosure has been described above with reference to the accompanying drawings. According to the embodiment, the terminal device receives the broadcast data packet in the Bluetooth broadcast mode, and parses the broadcast data packet according to the data packet parsing method of the standard Bluetooth protocol to acquire the content filled into the AD Type segment in the broadcast data packet. After the content filled into the AD Type segment is determined to be the designated data type, the content filled into the AD data segment is further acquired and decoded according to the preset decoding rule, and then the therapy data is acquired and displayed. The terminal device does not need to be paired with the respirator one to one, so that compared with the conventional medical instrument data transmission scheme, the device is simple in operation and applicable to various application scenarios.

It is commonly known to those skilled in the art that with the development of electronic information technology such as large-scale integrated circuit technology and a trend of software and hardware, it has become more difficult to clearly define a boundary between software and hardware of a computer system. It is because that any operation may be implemented by software or hardware. Any instruction may be executed by hardware or software. Whether certain machine function is able to be implemented by a hardware solution or a software solution depends on non-technical factors such as a price, a speed, a reliability, a storage capacity, a change period, and the like. Therefore, for those of ordinary skills in the field of electronic information technologies, the description of each operation in the solution is a way to describe a technical solution more directly and clearly. In the case of knowing the operation to be performed, those skilled in the art may directly design desired products based on consideration of the non-technical factors.

The disclosure may be a system, a method and/or computer program products. The computer program products may include a computer-readable storage medium loaded with computer-readable program instructions for enabling the processor to implement various aspects of the disclosure.

The computer-readable storage medium may be a tangible device that may keep and store instructions used by an instruction execution device. The computer-readable storage medium may be, but is not limited to, for example, an electric storage device, a magnetic storage device, an optical storage device, an electromagnetic storage device, a semiconductor storage device, or any suitable combination of the above. More specific examples (non-exhaustive list) of the computer-readable storage medium include: a portable computer disk, a hard disk, a random access memory (RAM), a read-only memory (ROM), an electrically programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punched card having instructions stored thereon or an internally bumped groove structure, and any suitable combination of the above. The computer-readable storage medium used herein is not explained as an instantaneous signal itself, such as a radio wave or other freely propagated electromagnetic waves, an electromagnetic wave propagated through a waveguide or other transmission media (e.g., through an optical pulse of an optical fiber cable), or an electric signal transmitted through a wire. The computer-readable program instructions described herein may be downloaded from the computer-readable storage medium to various computing/processing devices, or downloaded to an external computer or an external storage device through a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives the computer-readable program instructions from the network and transmits the computer-readable program instructions for storage in the computer-readable storage medium in each computing/processing device.

The computer program instructions for executing operations of the disclosure may be assembly instructions, instruction set architecture (ISA) instructions, machine instructions, machine-related instructions, micro-codes, firmware instructions, state setting data, or source codes or object codes written in any combination of one or more programming languages, the programming languages include object-oriented programming languages, such as Smalltalk, C++, and the like, and conventional procedural programming languages, such as a "c" language or a similar programming language. The computer-readable program instructions may be entirely executed on a user computer, partially executed on the user computer, as a stand-alone software package, partially executed on the user computer and partially executed on a remote computer, or entirely executed on the remote computer or a server. In the case of involving in the remote computer, the remote computer may be connected to the user computer via any kind of network, including a local area network (LAN) or a wide area network (WAN), or may be connected to an external computer (e.g., connected via the Internet using an Internet service provider). In some embodiments, an electronic circuit, such as a programmable logic device, a field-programmable gate array (FPGA) or a programmable logic array (PLA), is customized in a personalized manner by utilizing state information of the computer-readable program instructions, and the electronic circuit may execute the computer-readable program instructions to implement various aspects of the disclosure.

Various aspects of the disclosure have been described with reference to the flow charts and/or block diagrams of the method, device (system), and computer program products according to the embodiments of the disclosure. It should be understood that each block of the flow chart and/or block diagram and the combination of various blocks of the flow chart and/or block diagram may be implemented by the computer-readable program instructions.

These computer-readable program instructions may be provided to a general purpose computer, a special purpose computer, or a processor of other programmable data processing devices to produce a machine for the instructions executed by the computer or the processor of other programmable data processing devices to generate an apparatus for implementing the functions/actions specified in one or more blocks of the flow chart and/or block diagram. These computer-readable program instructions may also be stored in the computer-readable memory medium that may guide the computer, the programmable data processing device and/or other apparatus to work in a given manner, so that the computer-readable medium stored with the instructions includes a product including an instruction that implements various aspects of the functions/actions specified in one or more blocks of the flow chart and/or block diagram.

These computer-readable program instructions may also be loaded to the computer, other programmable data processing devices, or other apparatus, so that a series of operating steps are executed on the computer, the other programmable data, or the other apparatus to produce processing implemented by the computer, so that the instructions executed in the computer, the other programmable data, or the other apparatus implement the functions/actions specified in one or more blocks of the flow chart and/or block diagram.

Figure 8:
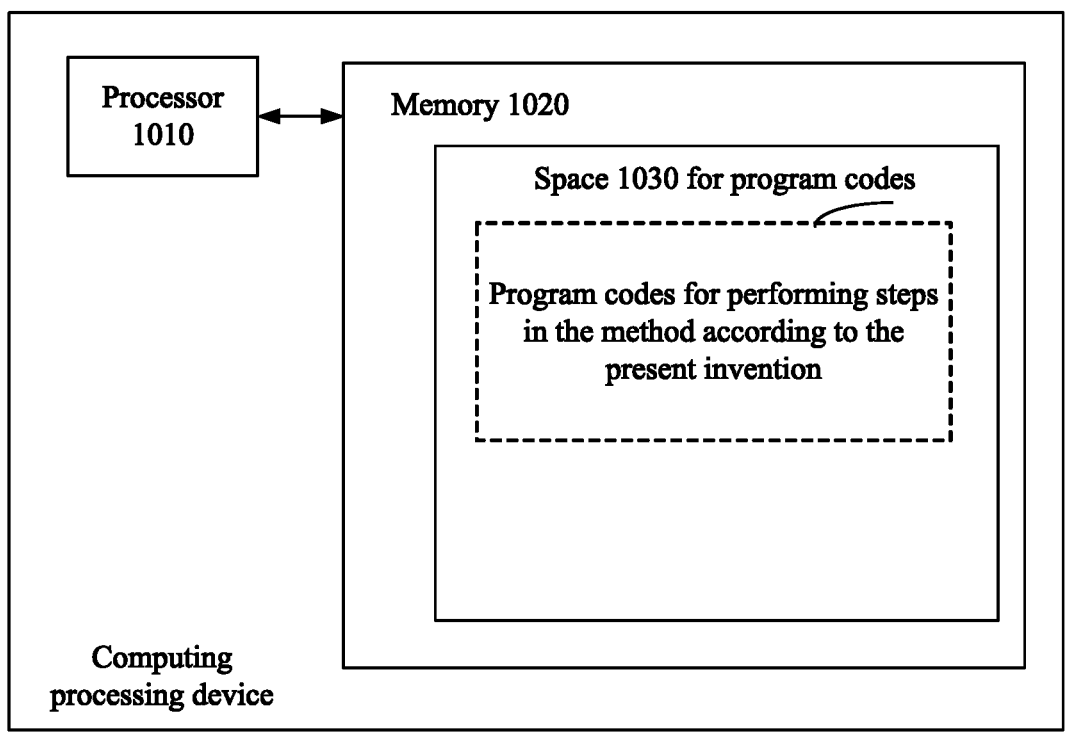
FIG. 8 is a schematic block diagram of a computing processing device configured to perform the method according to the present invention.
Figure 9:
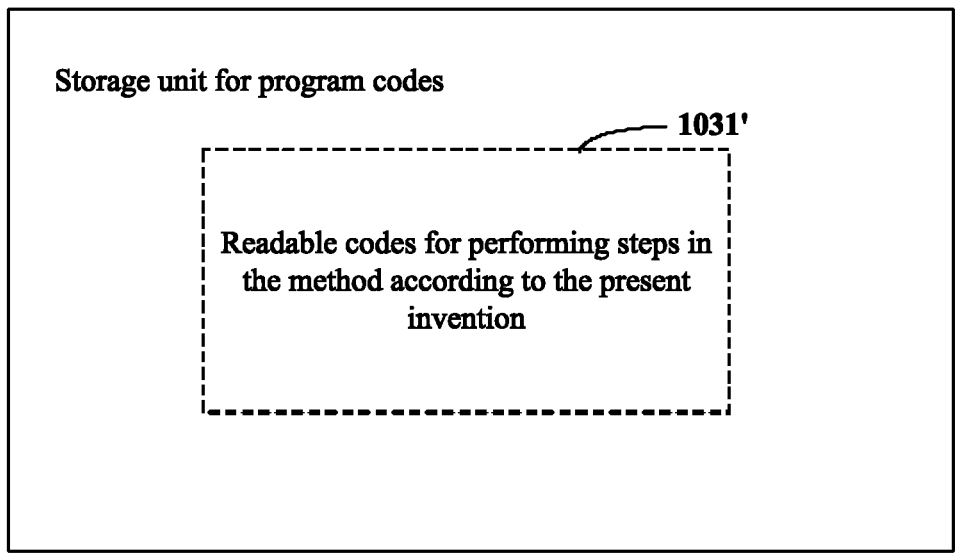
FIG. 9 schematically shows a storage unit configured to store or carry program codes for implementing the method according to the present invention.

For example, FIG. 8 shows a computing processing device that can implement the method for sending medical instrument data according or the method for receiving medical instrument to the present invention, the computing processing device is, for example, the foregoing server or client. The computing processing device conventionally includes a processor 1010 and a computer program product or a machine readable medium in the form of a memory 1020. The memory 1020 may be an electronic memory such as a flash memory, an electrically erasable programmable read-only memory (EEPROM), an erasable programmable read-only memory (EPROM), a hard disk, and a read-only memory (ROM). The memory 1020 has a storage space 1030 for program codes (instructions) 1031 for performing any method step in the foregoing method. For example, the storage space 1030 for program codes may include various program codes 1031 for implementing various steps in the foregoing method separately. These program codes may be read from one or more computer program products or written into the one or more computer program products. These computer program products include a program code medium such as a hard disk, a compact disc, a memory card or a floppy disk. Such a computer program product is usually a portable or fixed storage unit as shown in FIG. 9. The storage unit may have storage segments, storage spaces, and the like arranged similarly to the memory 1020 in the computing processing device in FIG. 8. Generally, the storage unit includes computer readable codes 1031', that is, codes that can be read by a processor such as the processor 1010. When these codes are run by the computing processing device, the computing processing device performs the steps in the method described above.

The flow chart and block diagram in the drawings show system architectures, functions and operations that are possible to be implemented according to the flow charts and/or block diagrams of the system, method, and computer program products according to the multiple embodiments of the disclosure. In this regard, each block of the flow chart or block diagram may represent a module, a program segment, or a part of instructions that contains one or more executable instructions for implementing specified logical functions. In some alternative implementations, the functions noted in the blocks may also occur in an order different from that noted in the drawings. For example, two consecutive blocks may actually be executed substantially concurrently, and they may also be executed in a reverse order sometimes, depending on the functions involved. It should also be noted that each block of the block diagram and/or flow chart, and the combination of the blocks of the block diagram and/or flow chart may be implemented by a special purpose hardware-based system that executes specified functions or actions, or may be implemented by the combination of special purpose hardware and computer instructions. It is commonly known to those skilled in the art that implementations by hardware, software and the combination of software and hardware are equivalent.

Various embodiments of the disclosure have been described above, and the above description is exemplary and non-exhaustive, and is not limited to the various embodiments disclosed. Many modifications and alterations that do not depart from the scope and spirit of the various embodiments described are apparent for those of ordinary skills in the art. The selection of the terms used herein is intended to best explain the principle, practical application or technical improvement in the market of the various embodiments, or to enable others of ordinary skills in the art to understand the various embodiments disclosed herein. The scope of the disclosure is defined by the appended claims.

What is claimed is:

1. A method for sending medical instrument data based on a Bluetooth protocol, comprising:
    starting a Bluetooth module;
    acquiring first therapy data of a medical instrument;
    according to a data packet encapsulation way of a standard Bluetooth protocol, filling a data length of the first therapy data into a data length Len segment of a Bluetooth data packet, presetting a first designated data type and filling the first designated data type into a data type AD Type segment, coding the first therapy data according to a preset coding rule, and then filling the first therapy data into a data AD data segment, to form a first broadcast data packet; and
    broadcasting the first broadcast data packet according to a preset period in a Bluetooth broadcast mode;
    wherein the method further comprises:
    when broadcasting the first broadcast data packet, receiving, by the medical instrument, a scanning request from an external terminal, wherein the scanning request comprises a data type instruction needed by the external terminal, wherein the data type instruction is designated therapy data needed to be acquired by the external terminal;
    according to the data type instruction in the scanning request, acquiring second therapy data corresponding to the medical instrument, according to the data packet encapsulation way of the standard Bluetooth protocol, filling a data length of the second therapy data into the data length Len segment of the Bluetooth data packet, presetting a second designated data type and filling the second designated data type into the data type AD Type segment, coding the second therapy data according to the preset coding rule, and then filling the second therapy data into the data AD data segment, to form a second broadcast data packet; and
    broadcasting the second broadcast data packet according to the preset period in the Bluetooth broadcast mode.

2. The method according to claim 1, wherein the first therapy data comprises: a serial number of the medical instrument, manufacturer information of the medical instrument, and statistical data and/or real-time data of the medical instrument within a statistical period.

3. A method for sending medical instrument data based on a Bluetooth protocol, comprising:
    starting a Bluetooth module;
    acquiring first therapy data of a medical instrument;
    according to a data packet encapsulation way of a standard Bluetooth protocol, filling a data length of the first therapy data into a data length Len segment of a Bluetooth data packet, presetting a first designated data type and filling the first designated data type into a data type AD Type segment, coding the first therapy data according to a preset coding rule, and then filling the first therapy data into a data AD data segment, to form a first broadcast data packet; and
    broadcasting the first broadcast data packet according to a preset period in a Bluetooth broadcast mode;
    wherein the preset coding rule comprises:
    according to data information of a plurality of statistical data contents comprising a data sub-packet indicating bit, a total frame number of data, a current frame number and the first therapy data, sequentially generating a decimal character string;
    converting the decimal character string into a hexadecimal character string; and
    sequentially converting each character in the hexadecimal character string into a corresponding ASCII code to acquire a corresponding ASCII code character string,
    wherein the data information of the plurality of statistical data contents is acquired by a sequential arrangement according to a preset sequence.

4. The method according to claim 3, wherein the first therapy data comprises: a serial number of the medical instrument, manufacturer information of the medical instrument, and statistical data and/or real-time data of the medical instrument within a statistical period.

5. A method for receiving medical instrument data based on a Bluetooth protocol, comprising:
    receiving a first broadcast data packet in a Bluetooth broadcast mode;
    according to a data packet parsing way of a standard Bluetooth protocol, parsing the first broadcast data packet to acquire a content filled into a data type AD Type segment in the first broadcast data packet; if the content filled into the data type AD Type segment in the first broadcast data packet is a first designated data type, acquiring a content filled into a data AD data segment in the first broadcast data packet, decoding the content filled into the data AD data segment in the first broadcast data packet according to a preset decoding rule, and then acquiring therapy data of the medical instrument; and
    displaying the therapy data;
    wherein, before displaying the therapy data, the method further comprises:
    sending a scanning request, wherein the scanning request contains a data type instruction needed by an external terminal, wherein the data type instruction is designated therapy data needed to be acquired by the external terminal;
    receiving a second broadcast data packet corresponding to the data type instruction; and
    according to the data packet parsing way of the standard Bluetooth protocol, parsing the second broadcast data packet to acquire a content filled into a data type AD Type segment in the second broadcast data packet; if the content filled into the data type AD Type segment in the second broadcast data packet is a second designated data type, acquiring a content filled into a data AD data segment in the second broadcast data packet, decoding the content filled into the data AD data segment in the second broadcast data packet according to the preset decoding rule, and then acquiring the designated therapy data.

6. The method according to claim 5, wherein the therapy data comprises: a serial number of the medical instrument, manufacturer information of the medical instrument, and statistical data and/or real-time data of the medical instrument within a statistical period.

7. A method for receiving medical instrument data based on a Bluetooth protocol, comprising:
- receiving a first broadcast data packet in a Bluetooth broadcast mode;
- according to a data packet parsing way of a standard Bluetooth protocol, parsing the first broadcast data packet to acquire a content filled into a data type AD Type segment in the first broadcast data packet; if the content filled into the data type AD Type segment in the first broadcast data packet is a first designated data type, acquiring a content filled into a data AD data segment in the first broadcast data packet, decoding the content filled into the data AD data segment in the first broadcast data packet according to a preset decoding rule, and then acquiring therapy data of the medical instrument; and
- displaying the therapy data;
- wherein the preset decoding rule comprises:
- converting an ASCII code character string into a corresponding hexadecimal character string;
- converting the hexadecimal character string into a decimal character string; and
- according to a sequence of each character in the decimal character string, sequentially determining data information of a plurality of statistical data contents comprising a data sub-packet indicating bit, a total frame number of data, a current frame number and the therapy data, wherein the data information of the plurality of statistical data contents is acquired by a sequential arrangement according to a preset sequence.

8. The method according to claim 7, wherein, before displaying the therapy data, the method further comprises:
- determining whether the therapy data is transmitted in a sub-packet manner according to the data sub-packet indicating bit in the first broadcast data packet; and
- when determining that the therapy data is transmitted in the sub-packet manner, sending a scanning request again.

9. A device for sending medical instrument data based on a Bluetooth protocol, comprising a processor, a memory and a computer program stored on the memory and executable on the processor, wherein
the processor executes instructions to enable the computer program to perform the following operations, comprising:
- starting a Bluetooth module;
- acquiring first therapy data of a medical instrument;
- according to a data packet encapsulation way of a standard Bluetooth protocol, filling a data length of the first therapy data into a data length Len segment of a Bluetooth data packet, presetting a first designated data type and filling the first designated data type into a data type AD Type segment, coding the first therapy data according to a preset coding rule, and then filling the first therapy data into a data AD data segment, to form a first broadcast data packet; and
- broadcasting the first broadcast data packet according to a preset period in a Bluetooth broadcast mode;
- wherein the processor is further configured to perform the following steps, comprising: when broadcasting the first broadcast data packet, receiving a scanning request from an external terminal;
- parsing a data type instruction contained in the scanning request, wherein the data type instruction is designated therapy data needed to be acquired by the external terminal;
- according to a parsing result, collecting second therapy data corresponding to the medical instrument;
- according to the data packet encapsulation way of the standard Bluetooth protocol, filling a data length of the second therapy data into the data length Len segment of the Bluetooth data packet, setting a second designated data type and filling the second designated data type into the data type AD Type segment, coding the second therapy data according to the preset coding rule, and then filling the second therapy data into the data AD data segment, to form a second broadcast data packet; and
- broadcasting the second broadcast data packet according to the preset period in the Bluetooth broadcast mode.

10. The device according to claim 9, wherein the preset coding rule comprises:
- according to data information of a plurality of statistical data contents comprising a data sub-packet indicating bit, a total frame number of data, a current frame number and the first therapy data, sequentially generating a decimal character string;
- converting the decimal character string into a hexadecimal character string; and
- sequentially converting each character in the hexadecimal character string into a corresponding ASCII code to acquire a corresponding ASCII code character string,
- wherein the data information of the plurality of statistical data contents is acquired by a sequential arrangement according to a preset sequence.

11. The device according to claim 9, wherein the first therapy data comprises: a serial number of the medical instrument, manufacturer information of the medical instrument, and statistical data and/or real-time data of the medical instrument within a statistical period.

12. A non-transitory computer-readable storage medium, wherein a computer program is stored on the non-transitory computer-readable storage medium, and when executed by a processor, the computer program implements the method for sending the medical instrument data according to claim 2.

13. The non-transitory computer-readable storage medium according to claim 12, wherein method further comprising:
- when broadcasting the first broadcast data packet, receiving, by the medical instrument, a scanning request from an external terminal, wherein the scanning request comprises a data type instruction needed by the external terminal, wherein the data type instruction is designated therapy data needed to be acquired by the external terminal;
- according to the data type instruction in the scanning request, acquiring second therapy data corresponding to the medical instrument, according to the data packet encapsulation method of the standard Bluetooth protocol, filling a data length of the second therapy data into the data length Len segment of the Bluetooth data packet, presetting a second designated data type and filling the second designated data type into the data type AD Type segment, coding the second therapy data according to the preset coding rule, and then filling the second therapy data into the data AD data segment, to form a second broadcast data packet; and
- broadcasting the second broadcast data packet according to the preset period in the Bluetooth broadcast mode.

14. The non-transitory computer-readable storage medium according to claim 12, wherein the preset coding rule comprises:

according to data information of a plurality of statistical data contents comprising a data sub-packet indicating bit, a total frame number of data, a current frame number and the first therapy data, sequentially generating a decimal character string;

converting the decimal character string into a hexadecimal character string; and sequentially converting each character in the hexadecimal character string into a corresponding ASCII code to acquire a corresponding ASCII code character string, wherein the data information of the plurality of statistical data contents is acquired by a sequential arrangement according to a preset sequence.

15. The non-transitory computer-readable storage medium according to claim 12, wherein the first therapy data comprises: a serial number of the medical instrument, manufacturer information of the medical instrument, and statistical data and/or real-time data of the medical instrument within a statistical period.

16. A non-transitory computer-readable storage medium, wherein a computer program is stored on the non-transitory computer-readable storage medium, and when executed by a processor, the computer program implements the method for receiving the medical instrument data according to claim 5.

* * * * *